(12) United States Patent
Hara et al.

(10) Patent No.: US 9,094,894 B2
(45) Date of Patent: Jul. 28, 2015

(54) WIRELESS COMMUNICATION TERMINAL AND WIRELESS COMMUNICATION TERMINAL CONTROL METHOD

(75) Inventors: Yasushi Hara, Kawasaki (JP); Youichi Kondou, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 572 days.

(21) Appl. No.: 12/628,745

(22) Filed: Dec. 1, 2009

(65) Prior Publication Data
US 2010/0189087 A1 Jul. 29, 2010

Related U.S. Application Data

(63) Continuation-in-part of application No. 12/359,315, filed on Jan. 24, 2009, now abandoned.

(30) Foreign Application Priority Data

Jan. 23, 2009 (JP) ................ 2009-013553

(51) Int. Cl.
| | | |
|---|---|---|
| *H04W 4/00* | (2009.01) | |
| *G08C 17/00* | (2006.01) | |
| *H04H 20/67* | (2008.01) | |
| *H04W 48/16* | (2009.01) | |
| *H04W 8/22* | (2009.01) | |
| *H04W 64/00* | (2009.01) | |

(Continued)

(52) U.S. Cl.
CPC ............ *H04W 48/16* (2013.01); *H04W 8/22* (2013.01); *H04W 64/00* (2013.01); *H04W 84/12* (2013.01); *H04W 88/06* (2013.01)

(58) Field of Classification Search
CPC ........ H04W 48/16; H04W 8/22; H04W 64/00
USPC ............... 370/311, 328, 329, 338; 455/161.1, 455/435.1, 456.1, 552.1
See application file for complete search history.

(56) References Cited

U.S. PATENT DOCUMENTS

| | | |
|---|---|---|
| 8,374,122 B2 | 2/2013 | Meier et al. |
| 8,379,558 B2 | 2/2013 | Lohtia et al. |

(Continued)

FOREIGN PATENT DOCUMENTS

| | | |
|---|---|---|
| EP | 1545146 A2 | 6/2005 |
| JP | 2004-15210 A | 1/2004 |

(Continued)

OTHER PUBLICATIONS

Japanese Office Action mailed Jan. 22, 2013 for corresponding Japanese Application No. 2009-013553, with English-language Translation.

(Continued)

*Primary Examiner* — Shripal Khajuria
*Assistant Examiner* — Farhad Ali
(74) *Attorney, Agent, or Firm* — Fujitsu Patent Center

(57) ABSTRACT

A mobile phone terminal receives current position information thereof from a public wireless base station, and stores the current position information. The mobile phone terminal reads a profile name corresponding to the position information from a public wireless base station-WLAN profile association table, and sets the WLAN profile as a scan profile. Then, the mobile phone terminal scans the WLAN profile when the mobile phone terminal is located outside the WLAN service area.

2 Claims, 20 Drawing Sheets

(51) Int. Cl.
*H04W 84/12* (2009.01)
*H04W 88/06* (2009.01)

(56) References Cited

U.S. PATENT DOCUMENTS

| | | | |
|---|---|---|---|
| 2006/0014537 A1* | 1/2006 | Arai et al. | 455/435.1 |
| 2006/0153133 A1 | 7/2006 | Zhong | |
| 2007/0047492 A1 | 3/2007 | Kim et al. | |
| 2007/0140163 A1* | 6/2007 | Meier et al. | 370/329 |
| 2009/0068970 A1* | 3/2009 | Ahmed et al. | 455/161.1 |

FOREIGN PATENT DOCUMENTS

| | | |
|---|---|---|
| JP | 2005-229399 | 8/2005 |
| JP | 2005-244533 A | 9/2005 |
| JP | 2005-341621 A | 12/2005 |
| JP | 2006-013594 | 1/2006 |
| JP | 2006-510271 A | 3/2006 |
| JP | 2006-135727 A | 5/2006 |
| JP | 2006-295643 | 10/2006 |
| JP | 2007-68170 A | 3/2007 |
| JP | 2007-82106 A | 3/2007 |
| JP | 2007-116294 | 5/2007 |
| JP | 2007-251304 A | 9/2007 |
| JP | 2007-311851 A | 11/2007 |
| JP | 2008-118538 A | 5/2008 |
| WO | WO-2005/101887 A1 | 10/2005 |

OTHER PUBLICATIONS

Extended European Search Report dated Apr. 26, 2013 for corresponding European Application No. 08165033.5.
European Office Action dated Feb. 11, 2014 for corresponding European Application No. 08165033.5.

* cited by examiner

FIG.3

| POSITION INFORMATION ACQUIRED FROM BASE STATION | PROFILE NAME | WIRELESS CHANNEL SETTING |
|---|---|---|
| A | PROFILE 01 | Auto (1,6,11,14) |
| A | PROFILE 02 | Auto (1-14) |
| B | PROFILE 03 | Auto (1,6,11,14) |
| C | PROFILE 04 | Auto (1,6,11,14) |
| C | PROFILE 05 | Auto (1-14) |

FIG.4

EXAMPLE OF SCAN PROFILE FOR TIME OUT OF WLAN SERVICE AREA

| POSITION INFORMATION ACQUIRED FROM BASE STATION | PROFILE NAME |
|---|---|
| A | PROFILE 01 |
| A | PROFILE 02 |

| POSITION INFORMATION ACQUIRED FROM BASE STATION | PROFILE NAME | WIRELESS CHANNEL SETTING | NUMBER OF TIMES OF SCANNING |
|---|---|---|---|
| A | PROFILE 01 | 1,6 | 2 |
| A | PROFILE 02 | 1,6,11,13 | 4 |
| B | PROFILE 03 | 1 | 1 |
| C | PROFILE 04 | 6,11 | 2 |
| C | PROFILE 05 | 1,6,11 | 3 |

WIRELESS COMMUNICATION TERMINAL AND WIRELESS COMMUNICATION TERMINAL CONTROL METHOD

CROSS-REFERENCE TO RELATED APPLICATIONS

This application is a continuation-in-part of and claims the benefit of priority of U.S. patent application Ser. No. 12/359,315, with a filing date of Jan. 24, 2009, the entire contents of which are incorporated herein by reference. This application also is based upon and claims the benefit of priority of the prior Japanese Patent Application No. 2009-013553, filed on Jan. 23, 2009, the entire contents of which also are incorporated herein by reference.

FIELD

The embodiment discussed herein is directed to a wireless communication terminal that performs first wireless communication via a base station in a wireless public network, and performs second wireless communication via a wireless local area network (LAN) access point in a wireless LAN communication network smaller than the wireless public network, and a control method thereof.

BACKGROUND

A mobile phone (for example, a fixed mobile convergence (FMC) terminal, and a dual terminal) having a public network having a wide area (for example, freedom of mobile multimedia access (FOMA)), and a wireless communication network having a small area such as wireless local area network (WLAN) has been known. Such a mobile phone makes a call by data communication and voice over internet protocol (VoIP) in a communication area of WLAN-Access Point (AP), and performs operation of receiving Beacon in the absence of a call by the data communication and the VoIP. In the area outside WLAN-AP, the operation of receiving Beacon is stopped, and operation of scanning outside the WLAN area is performed regularly (see FIG. 19). A scan interval of the scan operation is set shorter so that connection can be established soon after entering the WLAN-AP.

When a mobile terminal is out of the WLAN-AP, a power source for WLAN can be turned off manually, but if a user forgets to turn off the power source, the scan operation is performed, and unnecessary electricity is consumed (see FIG. 20). For example, the user goes to a business trip without turning off the power source for WLAN, electricity is consumed by unintended scan operation, and the mobile terminal cannot be used as a telephone.

Technologies for solving unnecessary scan operation include a method disclosed in Japanese Laid-open Patent Publication No. 2007-116294 in which a contactless integrated circuit (IC) card is attached to a terminal, an entrance/exit managing apparatus (card reader) is prepared, IC card information is rewritten at the time of exit, and thereby a power source for WLAN is turned off. Moreover, Japanese Laid-open Patent Publication No. 2006-295643 discloses a method of turning on/off the power source for WLAN by a mobile phone base station notifying the terminal of a wireless LAN base station information in the base station.

As a technology for solving unnecessary scan operation, Japanese Laid-open Patent Publication No. 2006-13594 discloses a method of increasing the scan interval gradually, reducing the number of times of the scan operation, and suppressing consumed electricity. Japanese Laid-open Patent Publication No. 2005-229399 discloses a method of turning on/off the power source for WLAN by acquiring position information using global positioning system (GPS), and specifying WLAN areas.

With the technology disclosed in Japanese Laid-open Patent Publication No. 2007-116294, many additional facilities are required and the cost increases because an entrance/exit managing apparatus needs to be provided. Besides, with the technology disclosed in Japanese Laid-open Patent Publication No. 2006-295643, it is not suited for the access point for use by a corporation (company) and an individual and a complicate system architecture including a carrier is necessary because a mobile phone base station notifies a terminal of wireless LAN base station information in the base station.

With the technology disclosed in Japanese Laid-open Patent Publication No. 2006-13594, response at the time of restoration deteriorates because a scan interval is increased gradually. With the technology disclosed in Japanese Laid-open Patent Publication No. 2005-229399, electricity is consumed for position detection by GPS because position information is acquired by using GPS.

SUMMARY

According to an aspect of an embodiment, a wireless communication terminal performs first wireless communication via a base station in a public network, and second wireless communication via a wireless LAN access point in a wireless LAN communication network smaller than the wireless public network. The wireless communication terminal includes a base station profile storing unit, a current position information receiving and storing unit, a wireless profile setting unit, and a wireless profile scan unit. The base station profile storing unit stores position information transmitted from the base station in association with a wireless LAN profile that is wireless LAN access point information in a communication area of the base station. The current position information receiving and storing unit receives current position information of the wireless communication terminal from the base station and stores the current position information. The wireless profile setting unit reads a wireless LAN profile corresponding to the current position information received by the current position information receiving and storing unit from the base station profile storing unit, and sets the wireless LAN profile. The wireless profile scan unit scans the wireless LAN profile set by the wireless profile setting unit when reception intensity from the wireless LAN access point decreases below a predetermined threshold.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 3 is an example of a public wireless base station-WLAN profile association table;

FIG. 4 is an example of a scan profile storing unit when out of the WLAN service area;

DESCRIPTION OF EMBODIMENT(S)

Exemplary embodiments of the invention are described below with reference to the accompanying drawings.

In the following, an outline and features of a mobile phone terminal according to a first embodiment of the invention, and a configuration and a processing flow of the mobile phone terminal are described. In the following example, a fixed mobile convergence (FMC) terminal and a dual terminal are exemplified as mobile phone terminals having both a wide-area public network (FOMA, for example), and a small-area wireless communication network such as WLAN.

Figure 1:
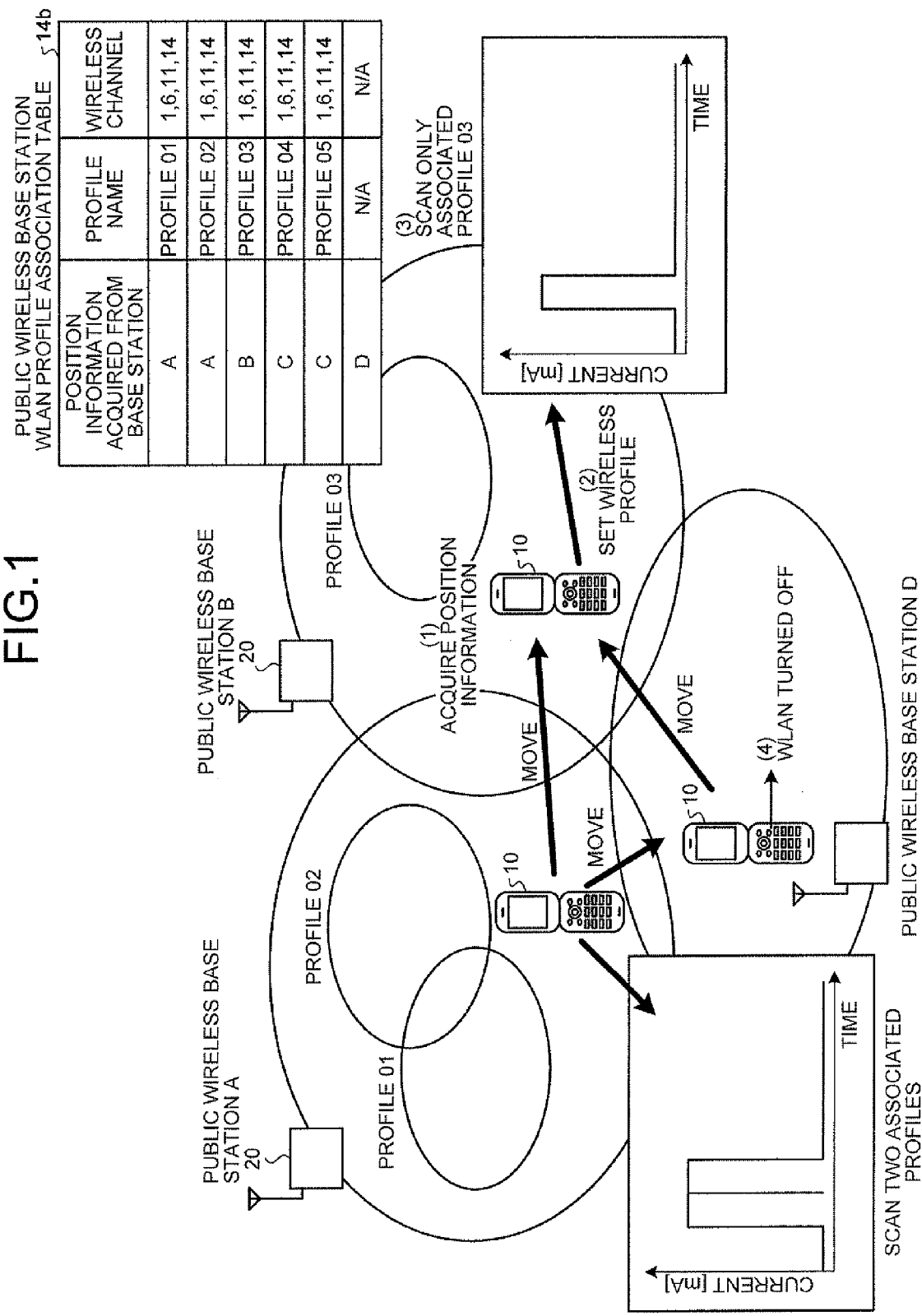
FIG. 1 is a diagram for explaining an outline and features of a mobile phone terminal according to a first embodiment of the invention.

An outline and features of a mobile phone terminal of the first embodiment is described with reference to FIG. 1. FIG. 1 is a diagram for explaining the outline and the features of the mobile phone terminal according to the first embodiment.

A mobile phone terminal 10 according to the first embodiment can perform both a wireless communication via a FOMA wireless base station 20 (hereinafter, a public wireless base station) in a wireless public network, and a wireless communication via a WLAN access point in a WLAN communication network having a smaller area than that of the wireless public network. The mobile phone terminal 10 can be realized with less cost and with a simple configuration, and provides a significant power saving effect.

Explaining specifically about its main features, as illustrated in FIG. 1, the mobile phone terminal 10 has a public wireless base station-WLAN profile association table 14b that stores position information acquired from a base station, names of wireless LAN profiles that are wireless LAN access point information in a communication area of the public wireless base station, and wireless channels in the profiles, in association with each other.

In this configuration, the mobile phone terminal 10 receives and stores therein its current position information from a public wireless base station 20 (see (1) in FIG. 1). Specifically, the mobile phone terminal 10 receives the position information every 2.56 seconds by a cellular system, and when the information is different from that stored in the mobile phone terminal 10 starts position information registration with the terminal (see FIG. 6 described below).

The mobile phone terminal 10 reads out a profile name corresponding to the acquired current position information from the public wireless base station-WLAN profile association table 14b, and sets the read WLAN profile as a scan profile (see (2) in FIG. 1).

The mobile phone terminal 10 then scans the set WLAN profile when located outside the WLAN service area, i.e., when located outside the communication area of the wireless LAN access point (see (3) in FIG. 1). In other words, explaining with reference to the example illustrated in FIG. 1, the mobile phone terminal 10 scans "Profile1" and "Profile2" in a public wireless base station "A", and the mobile phone terminal 10 scans only "Profile3" in a public wireless base station "B".

The mobile phone terminal 10 turns off power source for WLAN when located outside the WLAN service area, and the WLAN profile is not set in the public wireless base station-WLAN profile association table 14b, that is when the WLAN profile is not present in the public wireless base station 20 (see (4) in FIG. 1).

As described above, the mobile phone terminal 10 turns on/off the power source for WLAN depending on a public wireless base station area, unnecessary electricity for cellular search when the mobile phone terminal 10 is out of the service area can be reduced, only necessary WLAN profiles are scanned at a location where they are necessary, and connection becomes available as soon as the mobile phone terminal 10 enters an access point. Accordingly, a mobile phone terminal that can be realized with less cost and a simple configuration, and provides a significant power saving effect can be provided as in its main features described above.

Figure 2:
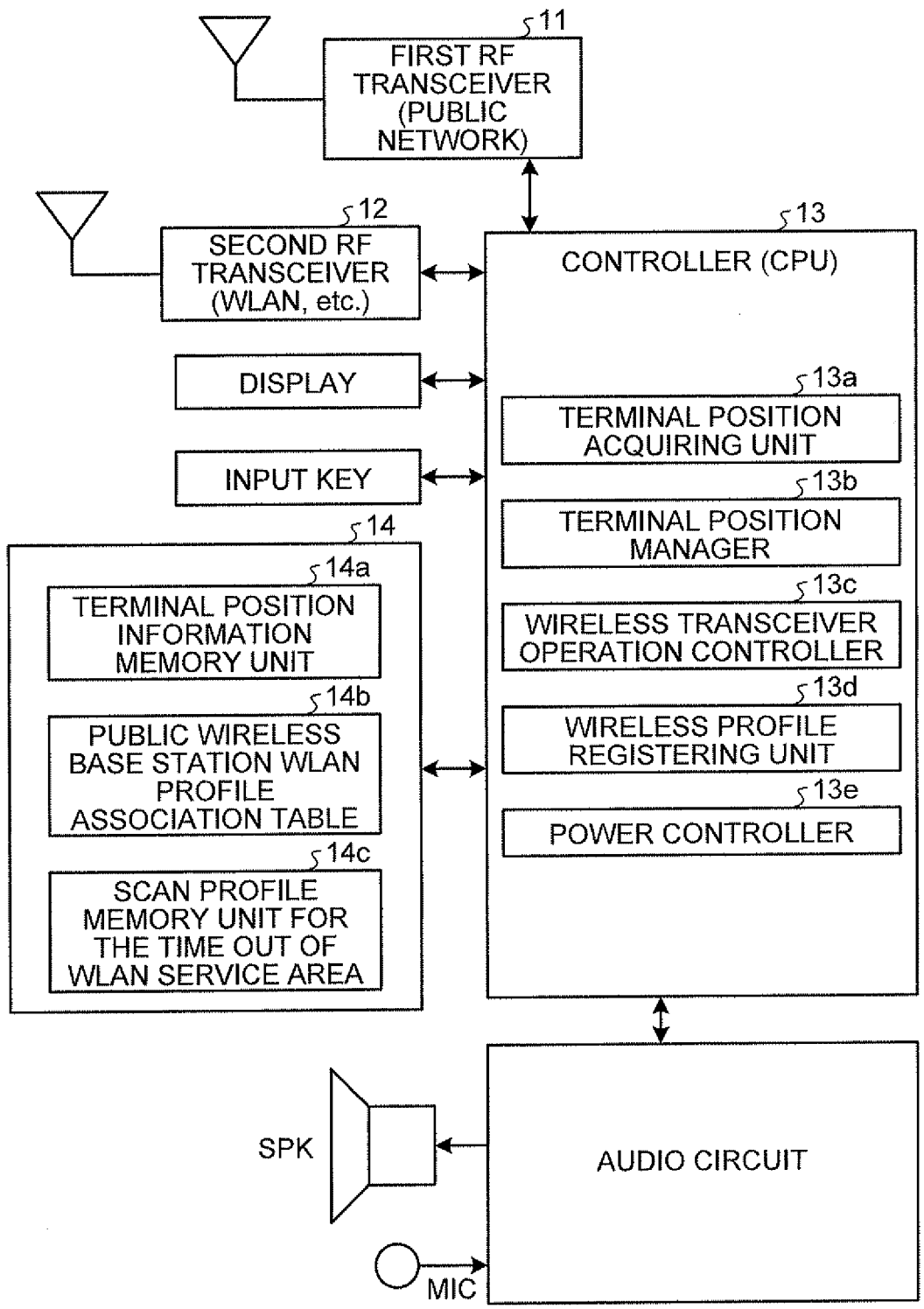
FIG. 2 is a block diagram of the mobile phone terminal according to the first embodiment illustrated in FIG. 1.

The configuration of the mobile phone terminal 10 illustrated in FIG. 1 is described with reference to FIG. 2. FIG. 2 is a block diagram of the mobile phone terminal 10 according to the first embodiment. As illustrated in FIG. 2, the mobile phone terminal 10 has a first RF transceiver 11, a second RF transceiver 12, a controller 13, and a storing unit 14. The operation of these units is described below.

The first RF transceiver 11 transmits and receives information wirelessly via the FOMA wireless base station 20 in the wireless public network. The second RF transceiver 12 transmits and receives information wirelessly via the WLAN access point in the WLAN communication network.

The storing unit 14 stores therein data and programs necessary for various types of processing by the controller 13, and specifically includes a terminal position storing unit 14a, the public wireless base station-WLAN profile association table 14b, and a scan profile storing unit 14c for the time out of the WLAN service area. The terminal position storing unit 14a stores terminal position information acquired by a terminal position acquiring unit 13a explained below.

The public wireless base station-WLAN profile association table 14b stores as illustrated in FIG. 3 position information acquired from the public wireless base station, names of wireless LAN profiles that are wireless LAN access point information in a communication area of the public wireless base station, and wireless channels in the profiles, in association with each other.

The scan profile storing unit 14c for the time out of the WLAN service area stores scan profiles at the time of scanning out of the WLAN service area set by a wireless profile registering unit 13d explained below. Specifically, the scan profile storing unit 14c for the time out of the WLAN area stores position information acquired from base stations and profile names in association with each other, as exemplified in FIG. 4. The stored profiles are scanned at the time of out of the WLAN service area.

The controller 13 has an internal memory for storing therein a computer program specifying various processing procedures and required data, and performs various types of processing using the same. The controller 13 includes the terminal position acquiring unit 13a, a terminal position manager 13b, a wireless transceiver operation controller 13c, the wireless profile registering unit 13d and a power controller 13e.

The terminal position acquiring unit 13a receives and stores therein its current position information from the public wireless base station 20. Specifically, the mobile phone terminal 10 receives position information every 2.56 seconds by a cellular system, and notifies the position information to the terminal position manager 13b.

Figure 6:
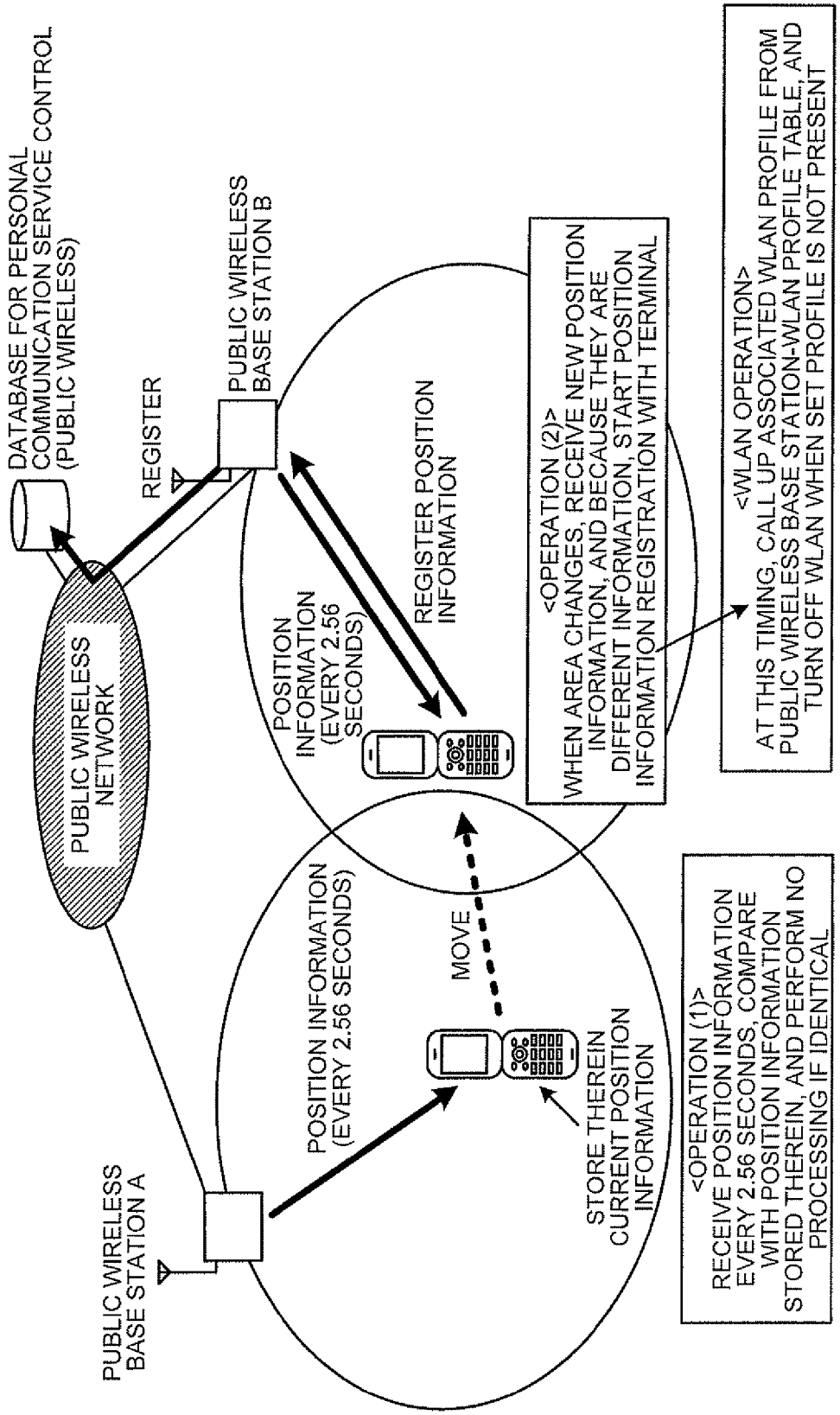
FIG. 6 is a diagram for explaining position information registration process.

The terminal position manager 13b manages the received position information. Specifically, the terminal position manager 13b compares as illustrated in FIG. 6 the position information notified from the terminal position acquiring unit 13a and position information stored in the terminal position storing unit 14a, and performs no processing if they are identical with each other. When they are not identical, the terminal position manager 13b starts position information registration process (cellular operation) with the terminal.

The terminal position manager 13b searches the public wireless base station-WLAN profile association table 14b based on the position information, and reads out a profile name corresponding to the acquired position information. When a profile corresponding to the public wireless base station is present, the terminal position manager 13b sets the read profile name in the scan profile storing unit 14c for the time out of the WLAN service area, as a scan profile at the time of scanning out of the service area.

The wireless transceiver operation controller 13c scans the WLAN profile set by the terminal position manager 13b at the time of out of the WLAN service area. Specifically, the wireless transceiver operation controller 13c reads out the scan profile storing unit 14c for the time out of the WLAN service area when scanning out of the service area when out of the WLAN service area, and when the WLAN profile is stored scans the read WLAN profile. When the WLAN profile is not set, the wireless transceiver operation controller 13c notifies the power controller 13e of this fact. When scanning the WLAN profile, scan intervals are set. This setting processing is explained in detail below with reference to FIG. 8.

Figure 5:
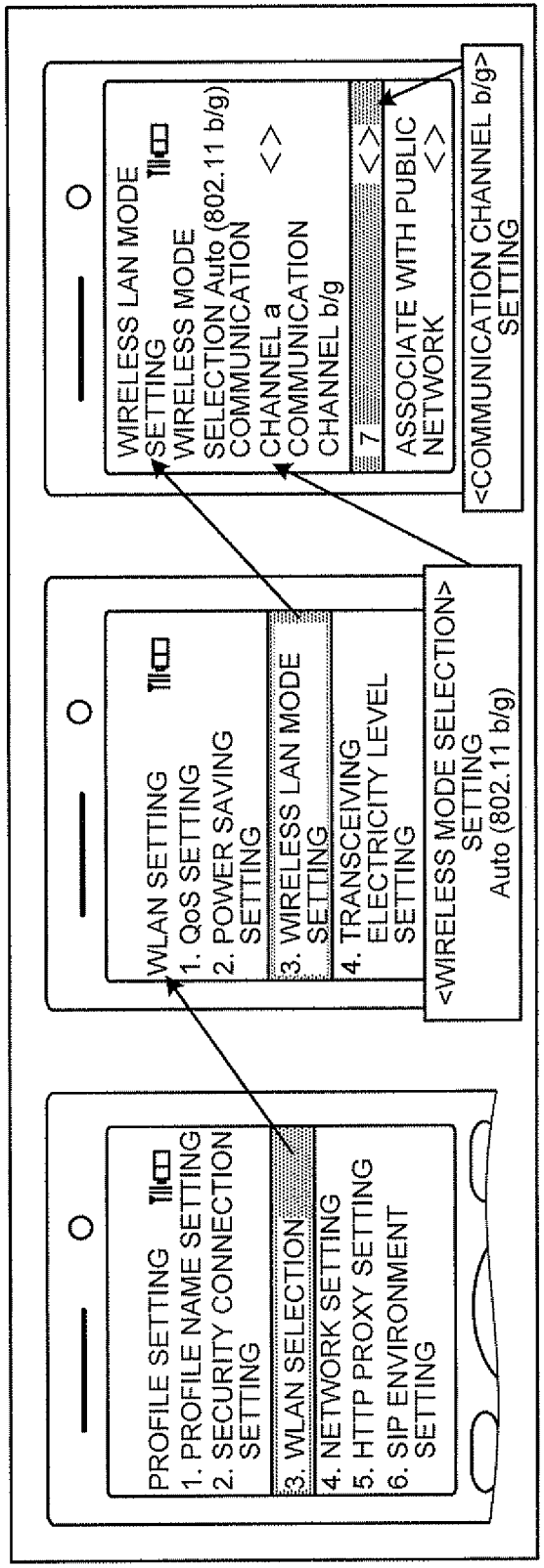
FIG. 5 is a diagram for explaining registration process by operation.

The wireless profile registering unit 13d registers position information, and profiles in association with each other in the public wireless base station-WLAN profile association table 14b. Specifically, when a WLAN profile is input by a manual operation with input keys, a complete button is pressed, and registration in association with the current public wireless base station is selected as illustrated in FIG. 5, the wireless profile registering unit 13d acquires current value data from the terminal position information, and rewrites data in the public wireless base station-WLAN profile association table 14b.

The power controller 13e controls to turn off a power source for WLAN when a profile corresponding to the public wireless base station is not present at the time of out of the WLAN service area. Specifically, the power controller 13e turns off the power source for WLAN when notified by the wireless transceiver operation controller 13c that a WLAN profile is not set.

Figure 7:
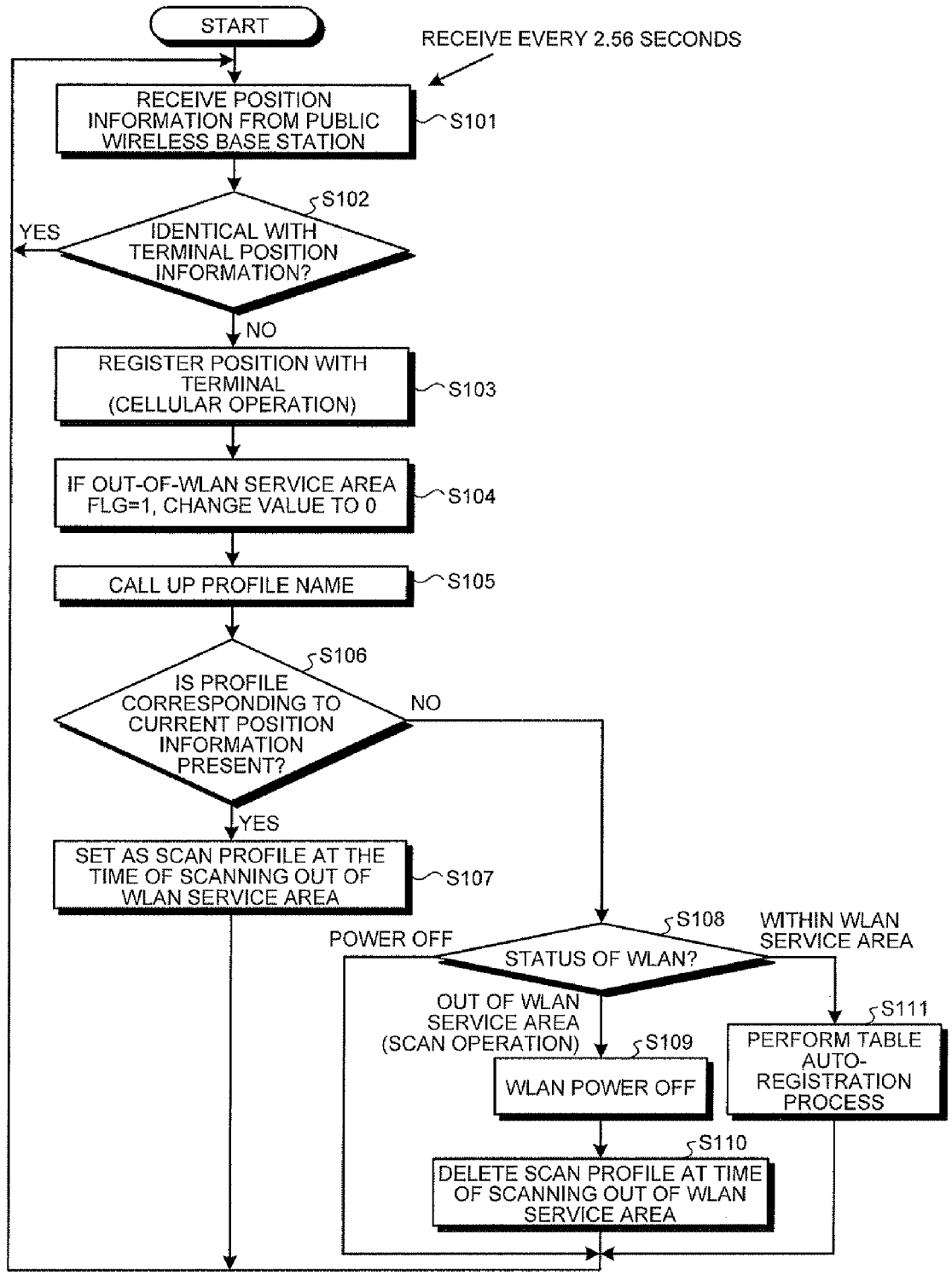
FIG. 7 is a flowchart of scan profile setting process performed by the mobile phone terminal of the first embodiment illustrated in FIG. 1.
Figure 8:
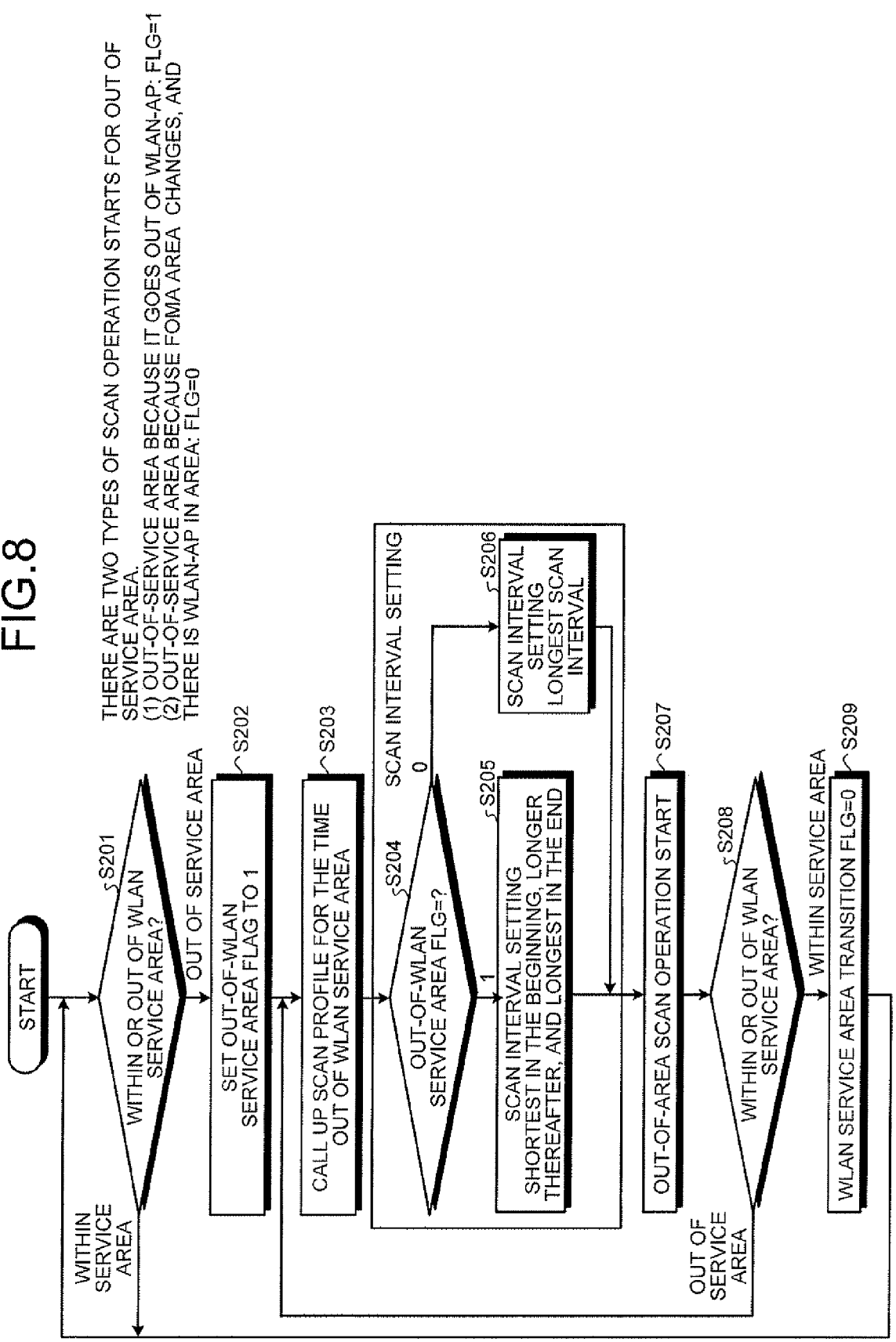
FIG. 8 is a flowchart of scan interval setting process performed by the mobile phone terminal of the first embodiment illustrated in FIG. 1.
Figures 9, 10:
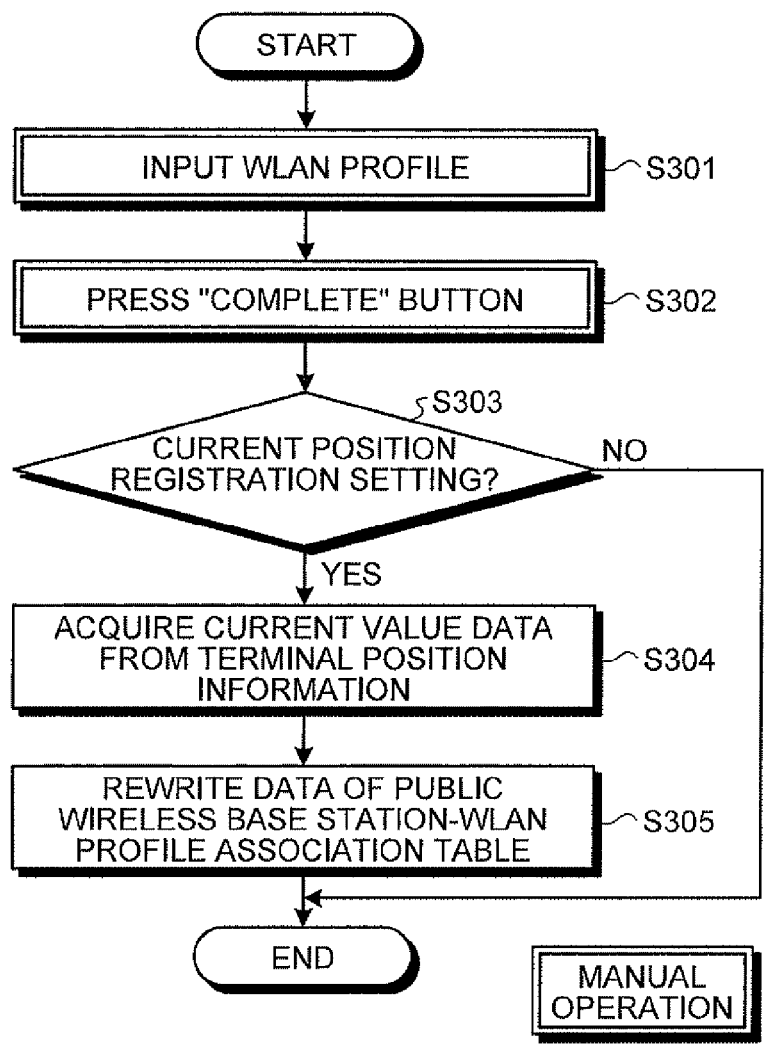
FIG. 9 is a flowchart of profile registration process performed by the mobile phone terminal of the first embodiment illustrated in FIG. 1.
FIG. 10 is an example of a public wireless base station-WLAN profile association table 14b stored in a mobile phone terminal according to a second embodiment of the invention.

The operation of the mobile phone terminal 10 of the first embodiment is described with reference to FIGS. 7 to 9. FIG. 7 is a flowchart of a scan profile setting process performed by the mobile phone terminal 10 according to the first embodiment, FIG. 8 is a flowchart of a scan interval setting process performed by the mobile phone terminal 10 according to the first embodiment, and FIG. 9 is a flowchart of a profile registration process performed by the mobile phone terminal 10 according to the first embodiment.

As illustrated in FIG. 7, when the mobile phone terminal 10 receives position information from the public wireless base station (step S101), the mobile phone terminal 10 determines whether the position information is identical with the terminal position information stored therein (step S102), and when identical returns to the step S101 without performing any processing. On the other hand, when the received position information and the stored position information are different, the mobile phone terminal 10 performs position registration process with the terminal (cellular operation) (step S103).

Then, when an out-of-WLAN service area flag indicates "1", the mobile phone terminal 10 changes the flag to indicate "0" (step S104), searches the public wireless base station-WLAN profile association table 14b, and calls up a profile name corresponding to the current position information (step S105).

When the profile corresponding to the current position information is present as a result (YES at the step 106), the mobile phone terminal 10 sets the read profile name at the scan profile storing unit 14c for the time out of the WLAN service area as a scan profile for the time out of the service area (step S107).

On the other hand, when a profile corresponding to the public wireless base station is not present (NO at the step 106), the mobile phone terminal 10 determines the status of WLAN (step S108). The mobile phone terminal 10 turns off power source for WLAN when located outside the WLAN service area (step S109), deletes a scan profile for the time scanning out of the WLAN service area (step S110), and reduces wasteful power consumption.

Figure 14:
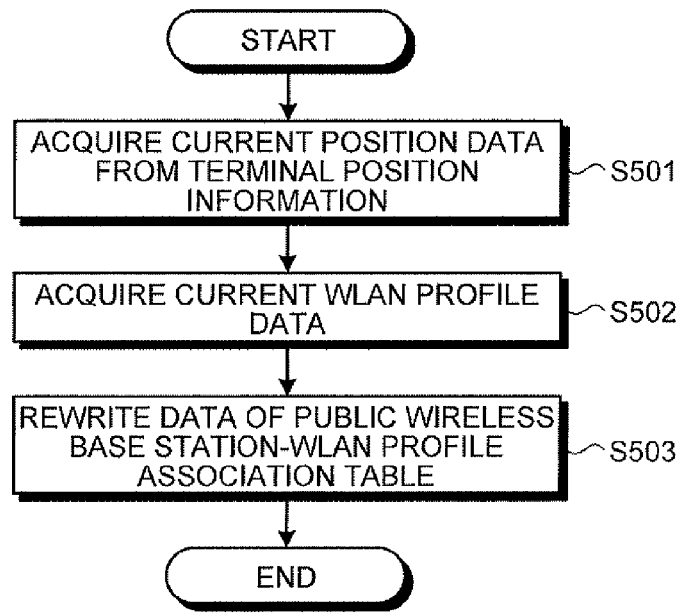
FIG. 14 is a flowchart of the process of the table auto-registration.
Figure 15:
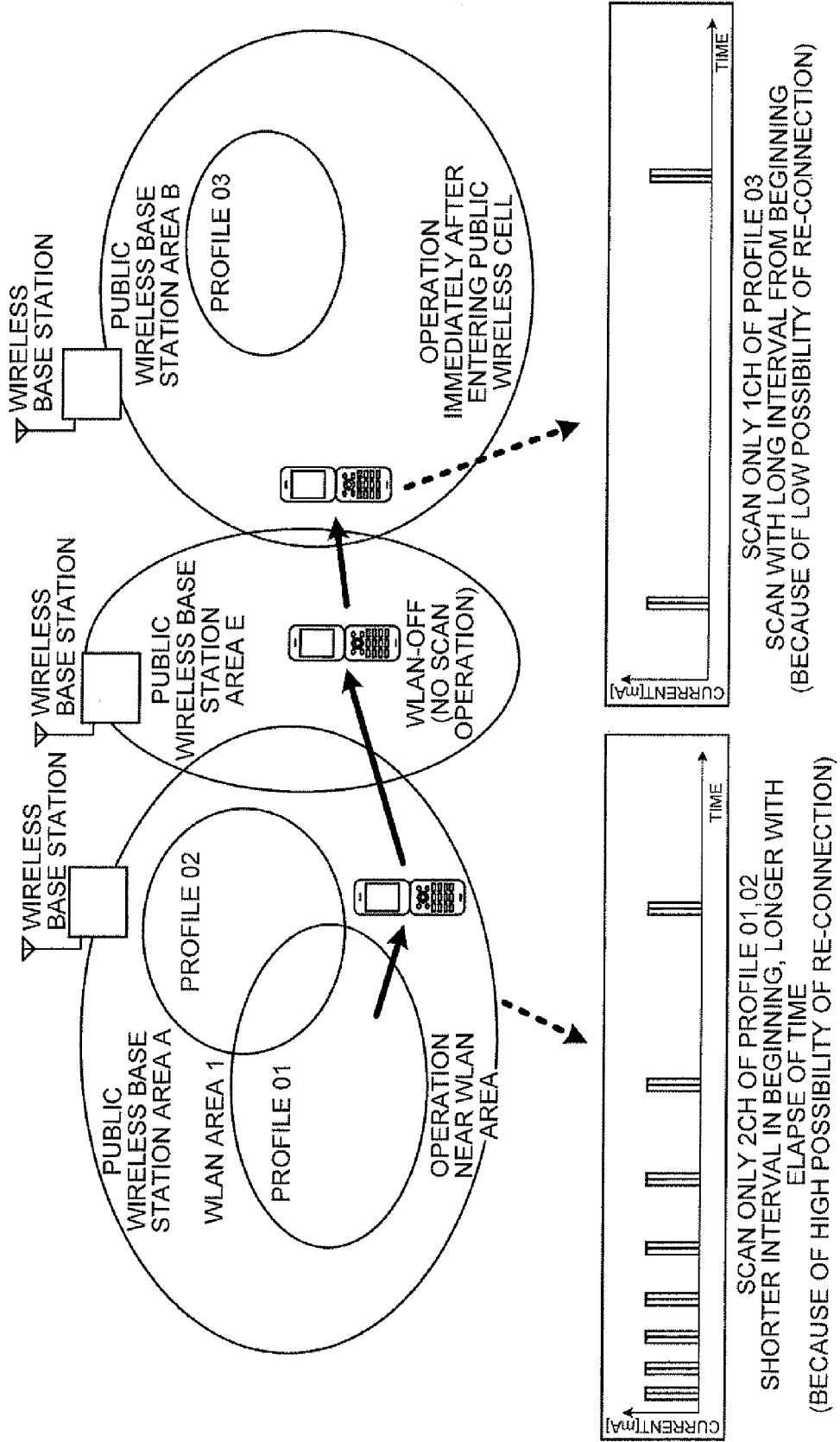
FIG. 15 is a diagram for explaining scan interval setting process

Moreover, when the status of the WLAN is within the WLAN service area, the mobile phone terminal 10 performs table auto-registration process (step S111). Explaining the table auto-registration process with reference to FIG. 14, the mobile phone terminal 10 acquires current position data from the terminal position information (step S501), and acquires current WLAN profile data (step S502)

Figure 13:
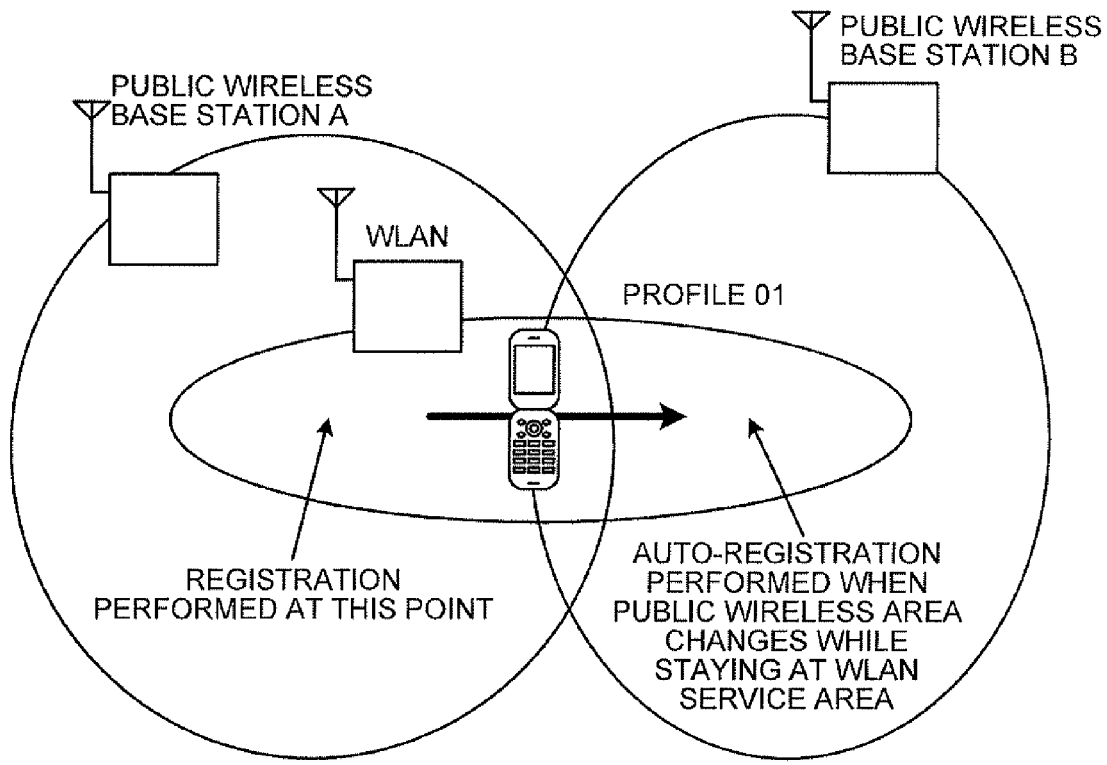
FIG. 13 is a diagram for explaining the process of table auto-registration.

The mobile phone terminal 10 then rewrites data of the public wireless base station-WLAN profile association table 14*b* (step S503). Specifically, as illustrated in FIG. 13, the mobile phone terminal 10 controls to perform auto-registration when the area of the public wireless base station changes while staying in the WLAN service area.

Scan interval setting process is described below with reference to FIG. 8. As illustrated in FIG. 8, the mobile phone terminal 10 determines whether the status of WLAN is within or out of the WLAN service area (Step S201). When the status is determined to be out of the service area, the out-of-WLAN service area flag is set as "1" (Step S202), and a scan program for out of the WLAN service area is called up (Step S203), and the scan interval setting process is performed.

The mobile phone terminal 10 determines whether the out-of-WLAN service area flag is "0" or "1" as the scan interval setting process (Step S204). When the out-of-WLAN service area flag is "1", the scan interval is set to be the shortest in the beginning, longer thereafter, and the longest in the end (Step S205). The mobile phone terminal 10 sets the scan interval to be the longest when the out-of-WLAN service area flag is changed to "0" in the process illustrated in FIG. 7 (Step S206).

The mobile phone terminal 10 then starts out-of-service area scan operation (Step S207), and determines whether it is within or outside the WLAN service area (Step S208). As a result, when determining that the mobile phone terminal 10 is outside the service area, the process returns to Step S203, and the process of Steps S203 to S207 are repeated. When the mobile phone terminal 10 determines it is within the WLAN service area, the out-of-WLAN service area flag is set as "0" (Step S209), and the process returns to Step S201.

Manual profile registration process is described below with reference to FIG. 9. As illustrated in FIG. 9, when a WLAN profile is input by a manual operation with input keys (step S301), a complete button is pressed (step S302), and registration in association with the current public wireless base station is selected (YES at step S303), the mobile phone terminal 10 acquires current value data from terminal position information (for example, public wireless base station ID) (step S304), and rewrites data of the public wireless base station-WLAN profile association table 14*b* (step S305).

As described above, the mobile phone terminal 10 does not require such facilities as an entrance/exit managing apparatus or a card reader, and does not necessitate additional functions to be added to the public network; therefore, the mobile phone terminal 10 can be realized with less cost. The mobile phone terminal 10 can be used for a corporate access point or a personal access point and for an access point like a generally used hotspot, without depending on types of the access points. Moreover, it does not require position detection by GPS, and does not consume unnecessary electricity for on/off control of WLAN; therefore, the mobile phone terminal can be realized with less cost and with a simple configuration, providing a significant power saving effect.

In addition, according to the first embodiment, scan operation is stopped by turning off the power source for WLAN when a wireless profile related to terminal position information is not present. Therefore, it is possible to provide a mobile phone terminal that provides a significant power saving effect.

Furthermore, according to the first embodiment, when it becomes out of the WLAN service area from within the service area, the profile is scanned such that the scan operation interval is the shortest in the beginning, and longer thereafter. Besides, the profile is scanned such that the scan operation interval is long from the beginning when the acquired position information is changed and the position information is stored while it is out of the WLAN service area. Therefore, it is possible to optimize the scan operation interval in accordance with the status of the terminal.

In the first embodiment, while position information is registered in the public wireless base station-WLAN profile association table 14*b* for each profile, it is not so limited, and the position information may be registered for each wireless channel.

In the following, a second embodiment is explained with reference to FIGS. 10 to 12, in which position information is registered in the public wireless base station-WLAN profile association table 14*b* for each wireless channel. FIG. 10 is an example of the public wireless base station-WLAN profile association table 14*b* held by the mobile phone terminal 10*a* according to the second embodiment, FIG. 11 is a diagram for explaining processing of registering position information for each wireless channel, and FIG. 12 is a flowchart of the process of registering the position information for each wireless channel of the mobile phone terminal 10*a* according to the second embodiment.

Described below is an example of the public wireless base station-WLAN profile association table 14*b* held by the mobile phone terminal 10*a* of the second embodiment. As illustrated in FIG. 10, the public wireless base station-WLAN profile association table 14*b* stores as in the first embodiment position information acquired from a base station, profile names, and wireless channels in the profiles in association with each other. Unlike the first embodiment, registration in the public wireless base station-WLAN profile association table 14*b* according to the second embodiment is performed for each wireless channel.

Figure 11:
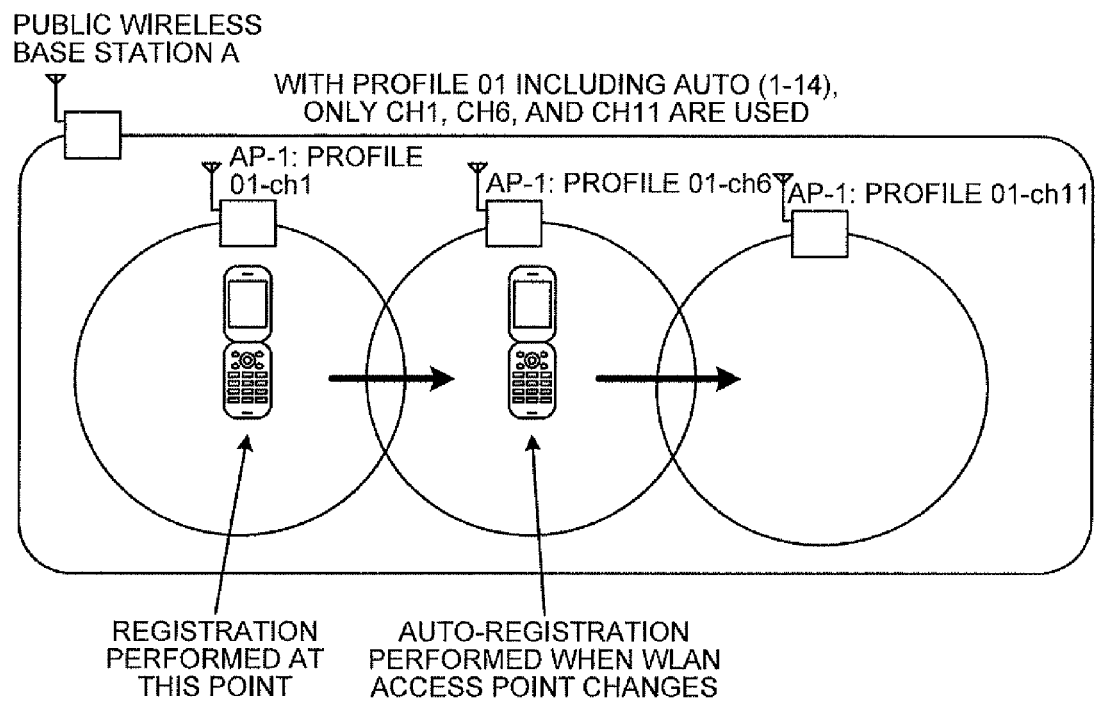
FIG. 11 is a diagram for explaining the process of registration for each wireless channel.

Specifically, as illustrated in FIG. 11, although Profile01 includes 14 channels (ch1 to ch14), actually only Ch1, ch6, and ch11 are used in some cases. In such cases, as illustrated in FIG. 11, when the mobile phone terminal 10*a* according to the second embodiment moves from the WLAN access point of ch1 to the WLAN access point of ch6, the mobile phone terminal 10*a* automatically registers ch6 in the public wireless base station-WLAN profile association table 14*b*.

Figure 12:
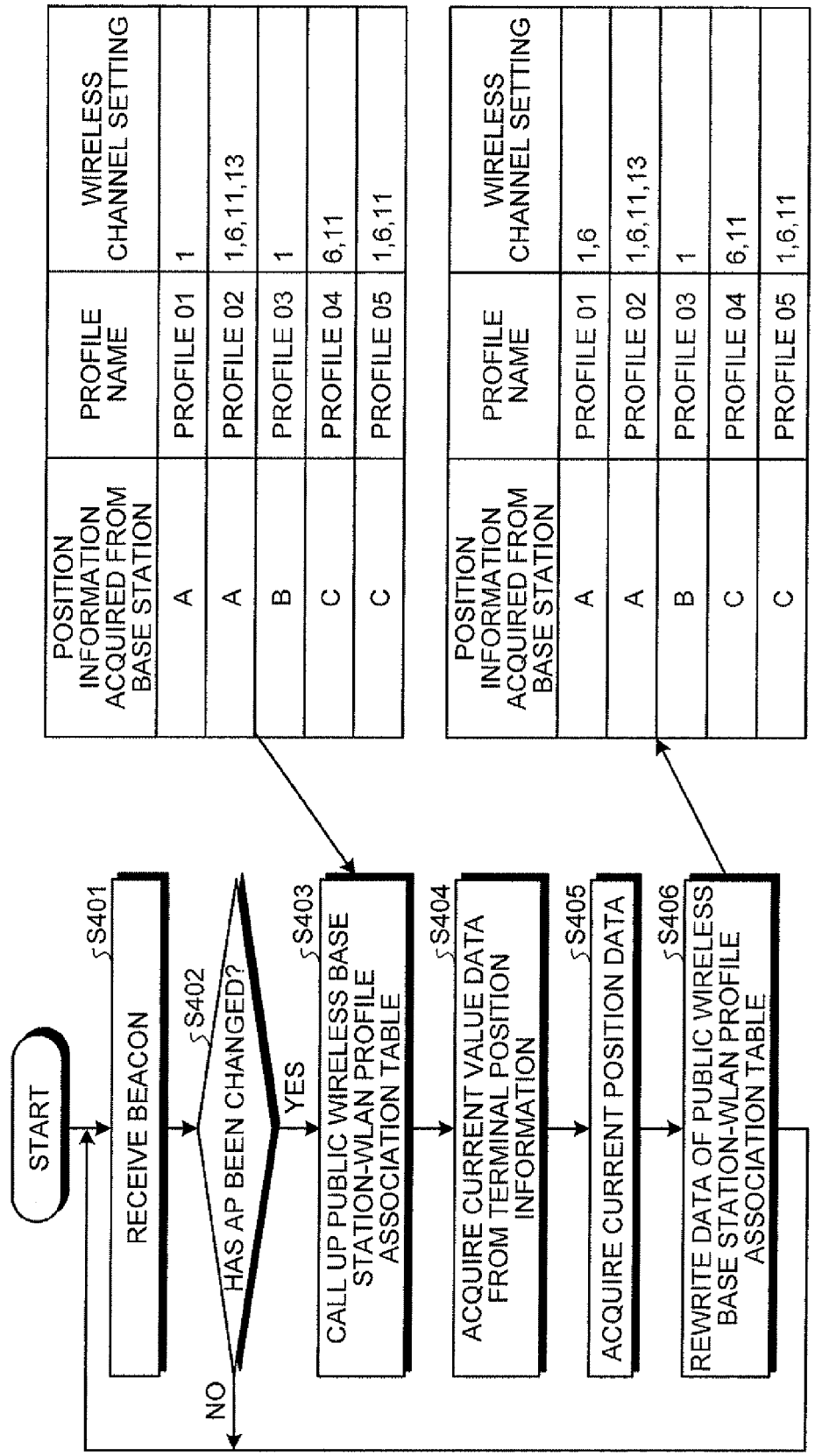
FIG. 12 is a flowchart of the process of registration for each wireless channel of the mobile phone terminal of the second embodiment.

With reference to FIG. 12, the process of registration for each wireless channel performed by the mobile phone terminal 10*a* of the second embodiment is described. The mobile phone terminal 10*a* receives beacon (step S401), and determines whether the access point has changed based on the information included in the received beacon (step S402). When the access point is determined to have changed as a result, the mobile phone terminal 10*a* calls up the public wireless base station-WLAN profile association table 14*b* (step S403).

The mobile phone terminal 10*a* then acquires current position data from the terminal position information (step S404), acquires current WLAN profile data (step S405), and rewrites data of the public wireless base station-WLAN profile association table 14*b* (registers ch6 in Profile01 in the example illustrated in FIG. 12) (step S406).

As described above, only actually used channels are scanned in the second embodiment, and accordingly it is possible to provide a mobile phone terminal providing a more significant power saving effect.

Incidentally, after a mobile phone terminal moves or goes out of a WLAN service area, only profiles and channels registered in a public wireless base station to which a profile used immediately before the mobile phone terminal goes out of the WLAN service area belongs may be scanned.

Figure 16:
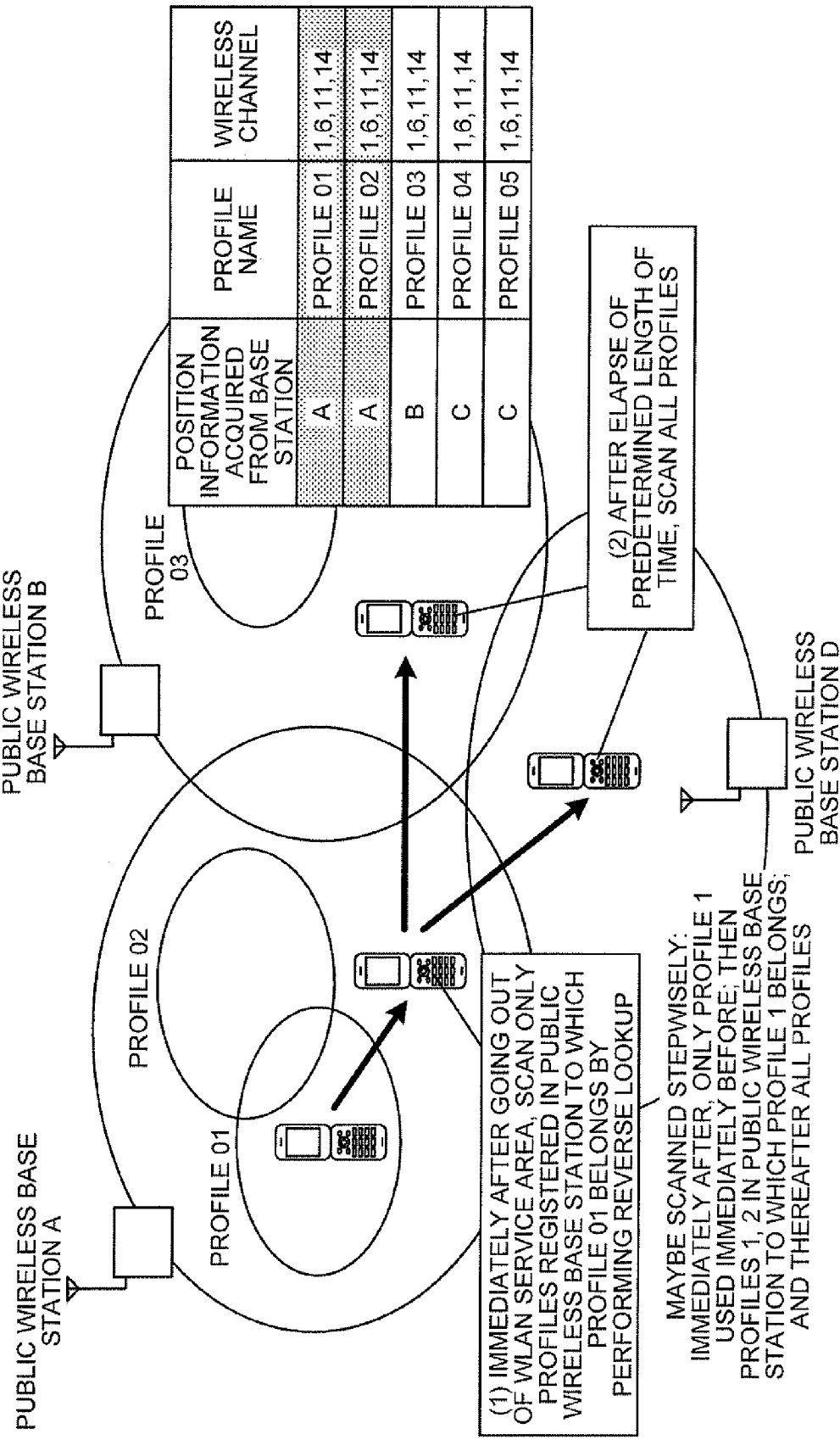
FIG. 16 is a diagram for explaining scan process after a mobile phone terminal according to a third embodiment of the invention goes out of the WLAN service area.
Figure 17:
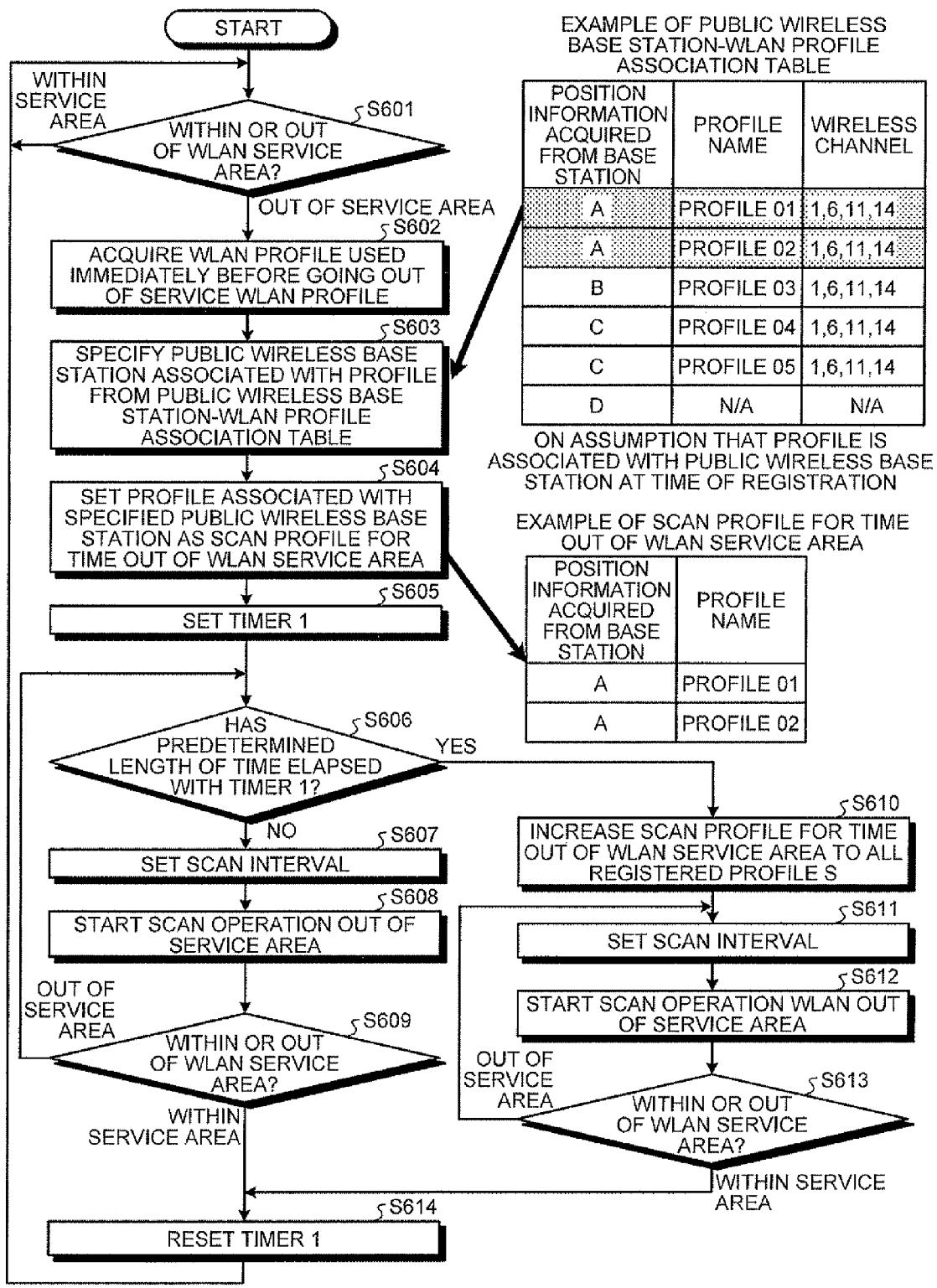
FIG. 17 is a flowchart of scan process after the mobile phone terminal of the third embodiment goes out of the WLAN service area.
Figure 18:
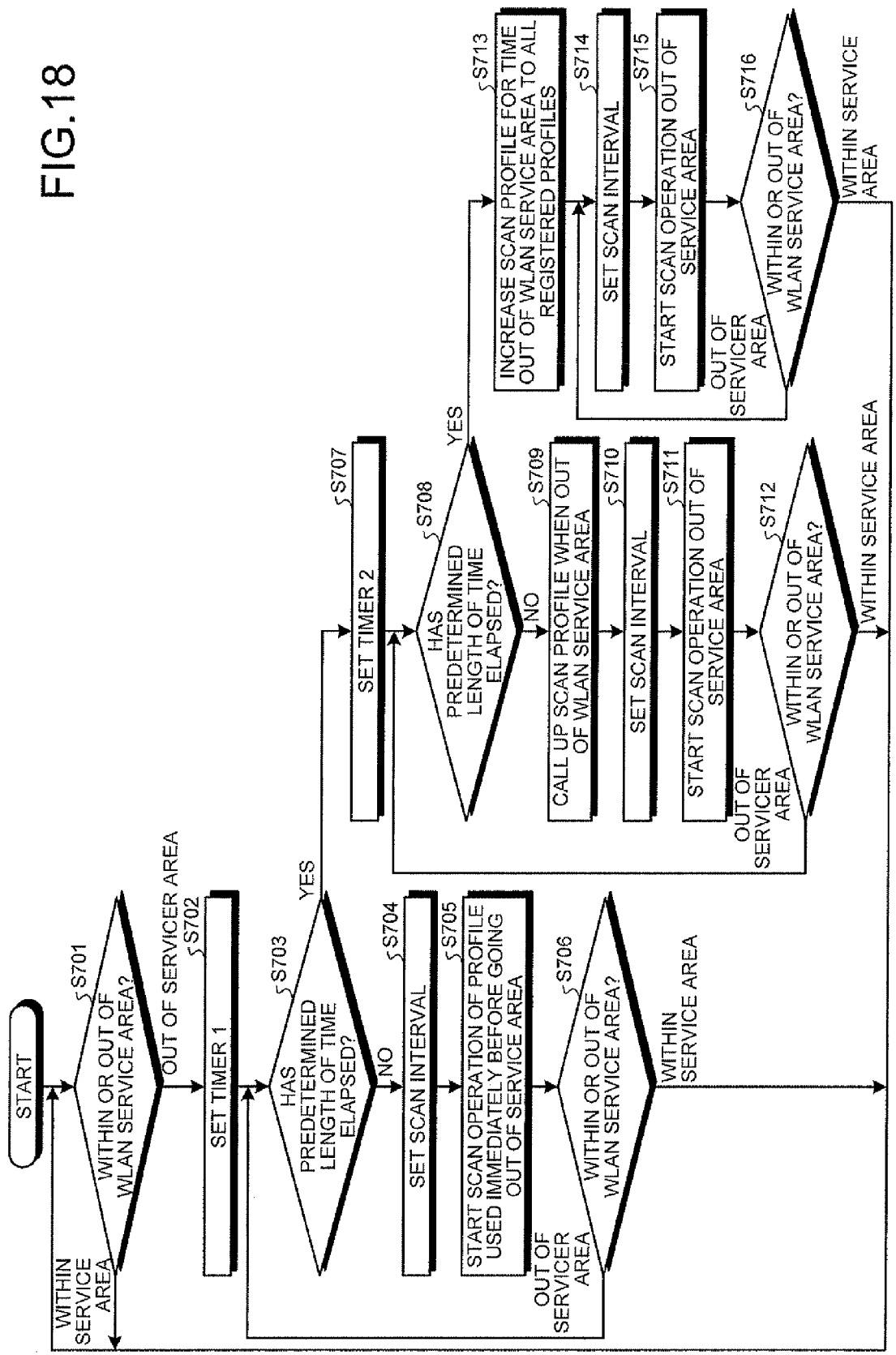
FIG. 18 is a flowchart of another scan process after the mobile phone terminal of the third embodiment goes out of the WLAN service area.
Figure 19:
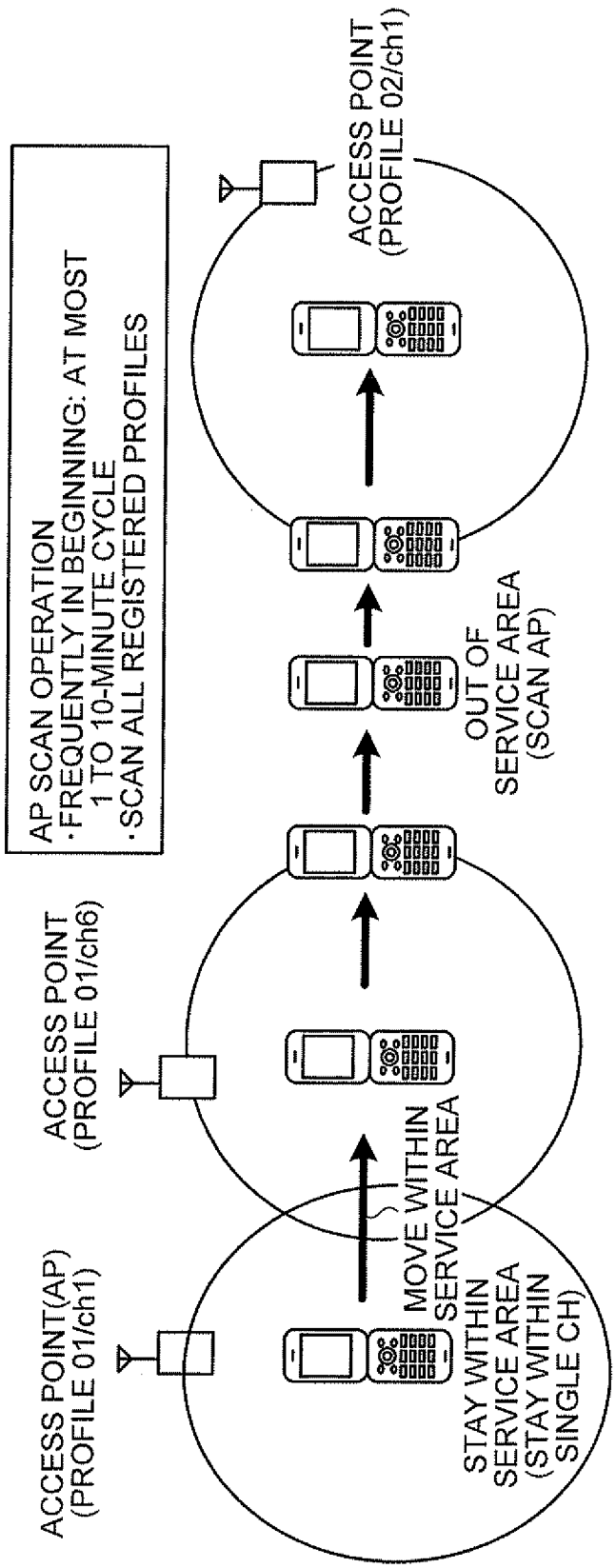
FIG. 19 is a diagram for explaining a conventional technology.
Figure 20:
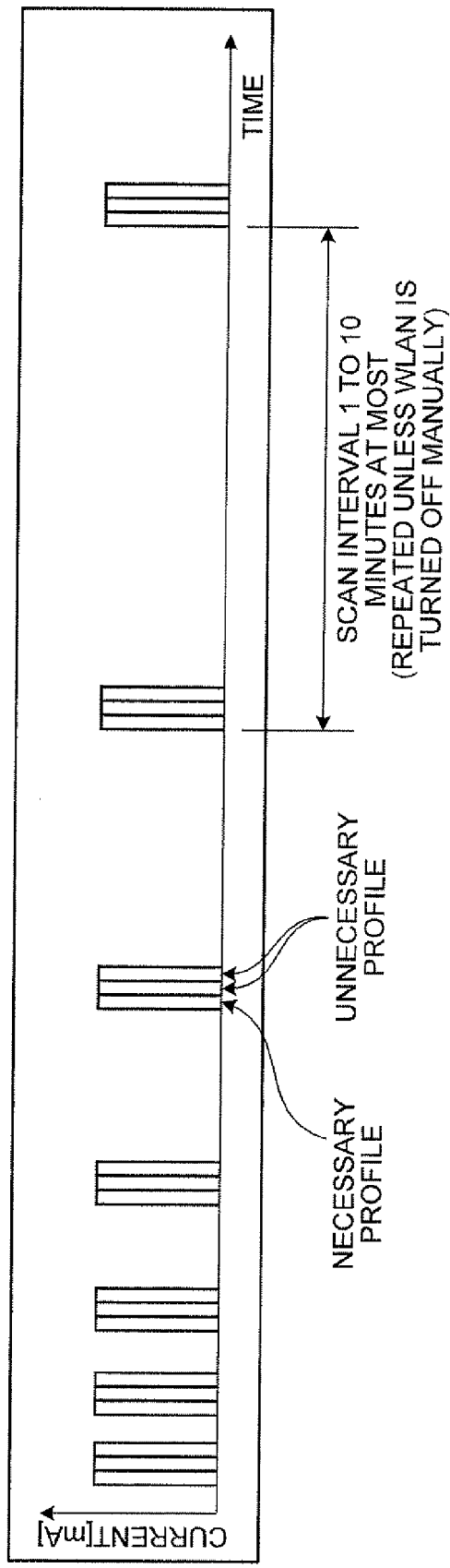
FIG. 20 is a diagram for explaining a conventional technology.

In the following, the mobile phone terminal 10*b* according to a third embodiment is described with reference to FIGS. 16 to 18, in which profiles and channels registered in a public wireless base station to which a profile used immediately before the mobile phone terminal 10b goes out of a WLAN service area are scanned. FIG. 16 is a diagram for explaining scan process after the mobile phone terminal 10b according to the third embodiment goes out of a WLAN service area, FIG. 17 is a flowchart of an example of scan process after the mobile phone terminal 10b of the third embodiment goes or moves out of the WLAN service area. FIG. 18 is a flowchart of another example of scan process after the mobile phone terminal 10b of the third embodiment goes out of the WLAN service area.

The scan process after the mobile phone terminal 10b goes out of the WLAN service area is described with reference to an example illustrated in FIG. 16. As illustrated in FIG. 16, the mobile phone terminal 10b performs reverse lookup of a table immediately after it goes out of a WLAN service area, and scans only profiles registered in a public wireless base station to which "Profile01" used immediately before it goes or moves out of the WLAN service area belongs (see (1) in FIG. 16).

After a lapse of a predetermined time, the mobile phone terminal 10b scans all the profiles (see (2) in FIG. 16). Other than changing profiles to be scanned at two steps as described above, profiles to be scanned may be changed at three steps: only immediately previous "Profile01" just after the mobile phone terminal goes out of the WLAN service area; "Profile01" and "Profile02" registered in the public wireless base station to which Profile01 belongs; and all the profiles.

The scan process after the mobile phone terminal 10b according to the third embodiment goes out of the WLAN service area is described with reference to FIGS. 17 and 18. FIG. 17 is a flowchart of the scan process in the case of changing profiles to be scanned at two steps. FIG. 18 is a flowchart of the scan process in the case of changing profiles to be scanned at three steps.

Specifically, as illustrated in FIG. 17, when the mobile phone terminal 10b goes out of the WLAN service area, (out of the WLAN service area at step S601), the mobile phone terminal 10b acquires the WLAN profile used immediately before going out of the WLAN profile (step S602), and specifies a public wireless base station associated with the profile acquired from the public wireless base station-WLAN profile association table 14b (step S603).

The mobile phone terminal 10b sets the profile corresponding to the specified public wireless base station as a scan profile for out of the WLAN service area (step S604), and sets a timer 1 (step S605). The mobile phone terminal 10b then determines whether a predetermined time has elapsed with the timer 1 (step S606), and if not sets a scan interval (step S607).

The mobile phone terminal 10b determines whether it is within or out of the WLAN service area (step S609), and if within the WLAN service area resets the time 1, and returns to the processing of the step S601, and if out of the WLAN service area repeats the processing of S606 to S609 until a lapse of a predetermined time. When the predetermined time has elapsed with the timer 1 (YES at step S606), the mobile phone terminal 10b increases the scan profile for out of the WLAN service area to all the registered profiles (step S610), sets the scan interval (step S611), and starts scan operation out of the service area (step S612).

Thereafter, the mobile phone terminal 10b determines whether it is within or out of the WLAN service area (step S613), and if within the WLAN service area resets the timer 1 (step S614), and the process returns to the processing at the step S601, and if out of the WLAN service area the process returns to the processing of the step S611 and repeats the processing.

The scan process in the case of changing profiles to be scanned at three steps is described below with reference to FIG. 18. As illustrated in FIG. 18, when the mobile phone terminal 10b goes out of the WLAN service area (out of the service area at step S701), the mobile phone terminal 10b sets the timer 1 (step S702), determines whether a predetermined time has elapsed (step S703), and if not sets a scan interval (step S704), and starts scan operation of a profile used immediately before going out of the service area (step S705). The mobile phone terminal 10b determines whether it is within or out of the WLAN service area (step S706), and if within the WLAN service area returns to the processing at the step S701, and if out of the WLAN service area repeats the processing at the steps S703 to S706 until an elapse of the predetermined time.

When the predetermined time has elapsed with the timer 1 (step S703), the mobile phone terminal 10b sets a timer 2 (step S707), and determines whether a predetermined time has elapsed with the timer 2 (step S708). When the predetermined time has not elapsed after setting the timer 2 (NO at step S708), the mobile phone terminal 10b calls up the scan profile when out of the WLAN service area (step S709), sets a scan interval (step S710), and starts scan operation out of the service area (step S711).

The mobile phone terminal 10b then determines whether it is within or out of the WLAN service area (step S712), and if within the WLAN service area returns to the processing at the step S701, and if out of the WLAN service area repeats the processing at the steps S708 to S712 until a lapse of the predetermined time.

On the other hand, when the predetermined time has elapsed after setting the timer 2 (YES at step S708), the mobile phone terminal 10b increases the scan profile for the time out of the WLAN service area to all the registered profiles (step S713), sets a scan interval (step S714), and starts the scan operation out of the service area (step S715).

Thereafter, the mobile phone terminal 10b determines whether it is within or out of the WLAN service area (step S716), and if within the WLAN service area returns to the processing at the step S701, and if out of the WLAN service area repeats the processing of the steps S714 to S716 until a lapse of the predetermined time.

As described above, according to the third embodiment, immediately after the mobile phone terminal 10b goes out of the WLAN service area, only the profiles and the channels registered in the public wireless base station to which the profile used immediately before the mobile phone terminal 10b goes out of the WLAN service area belongs are scanned; therefore, it is possible to provide a mobile phone terminal having an improved responsiveness of re-connection when the mobile phone terminal returns to the WLAN service area immediately after it has gone out of the WLAN service area and providing a significant power saving effect.

Moreover, scan profiles to be scanned are changed in accordance with an elapse of time. For example, immediately after the mobile phone terminal goes out of the WLAN service area, a profile used immediately before is scanned because the possibility of the mobile phone terminal returning to the same WLAN service area is high. After a lapse of a predetermined time, all the profiles are scanned because it cannot be known to which WLAB service area the mobile phone terminal returns. Accordingly, it is possible to provide a mobile phone terminal having an improved responsiveness of re-connection and providing a significant power saving effect.

Although in the first to third embodiments, a WLAN profile set as the scan profile is described as being scanned only when it is out of the WLAN service area, it is not so limited. Even within the WLAN service area, if the reception intensity is equal to or lower than a predetermined threshold, the set WLAN profile may be scanned.

Figure 21:
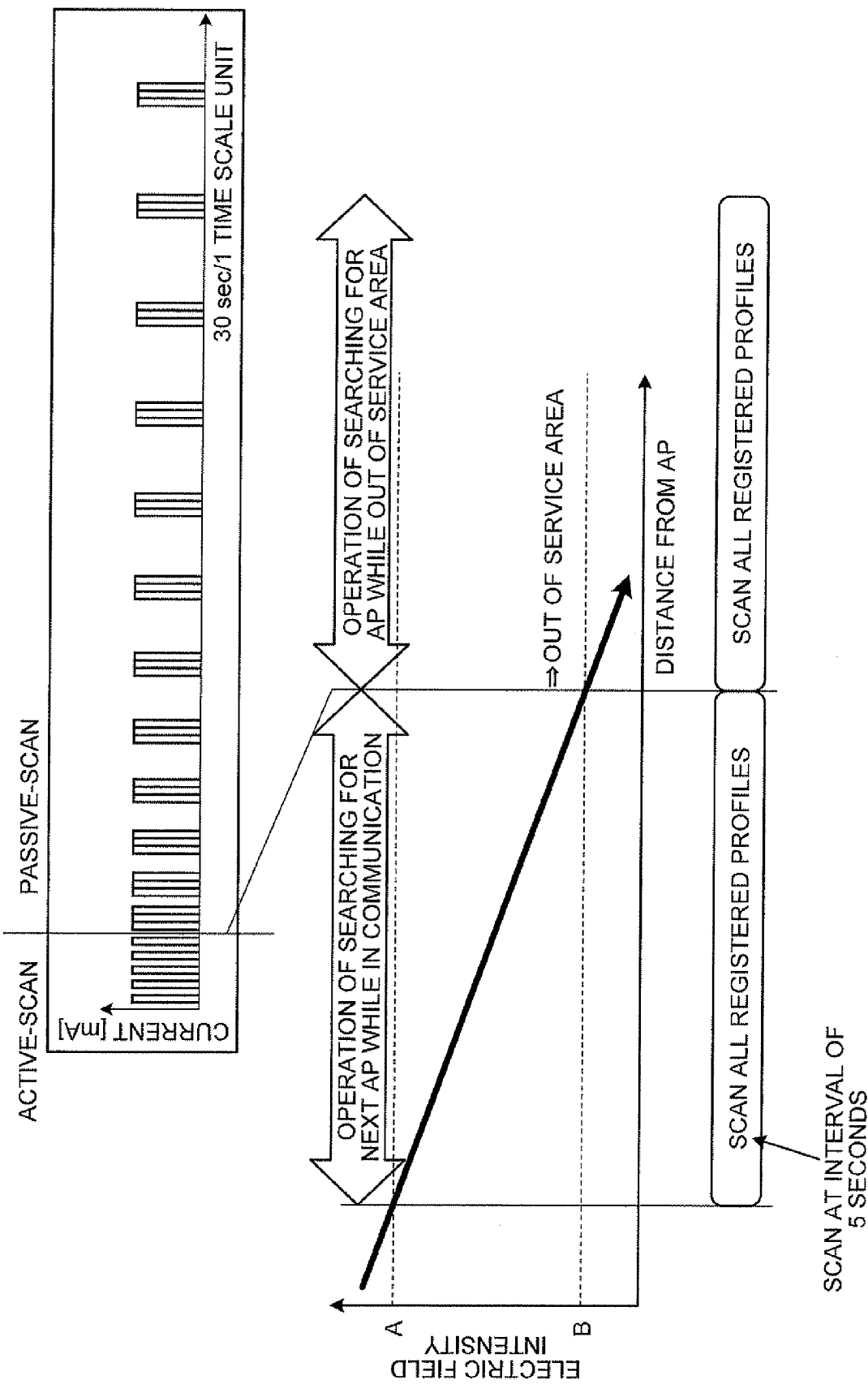
FIG. 21 is a diagram for explaining a conventional operation when reception intensity lowers.

That is, with a conventional mobile phone, as illustrated in FIG. 21, not only when located outside the WLAN-AP service area (out of the WLAN service area), but also when it is within the WLAN service area, if an electric field intensity is equal to or lower than a predetermined threshold (in other words, if the electric field intensity is between A and B in an example illustrated in FIG. 21), scan operation of searching for a next access point is performed at an interval of about 5 seconds while the mobile phone is in communication. The conventional mobile phone ends up scanning all the registered profiles.

Figure 22:
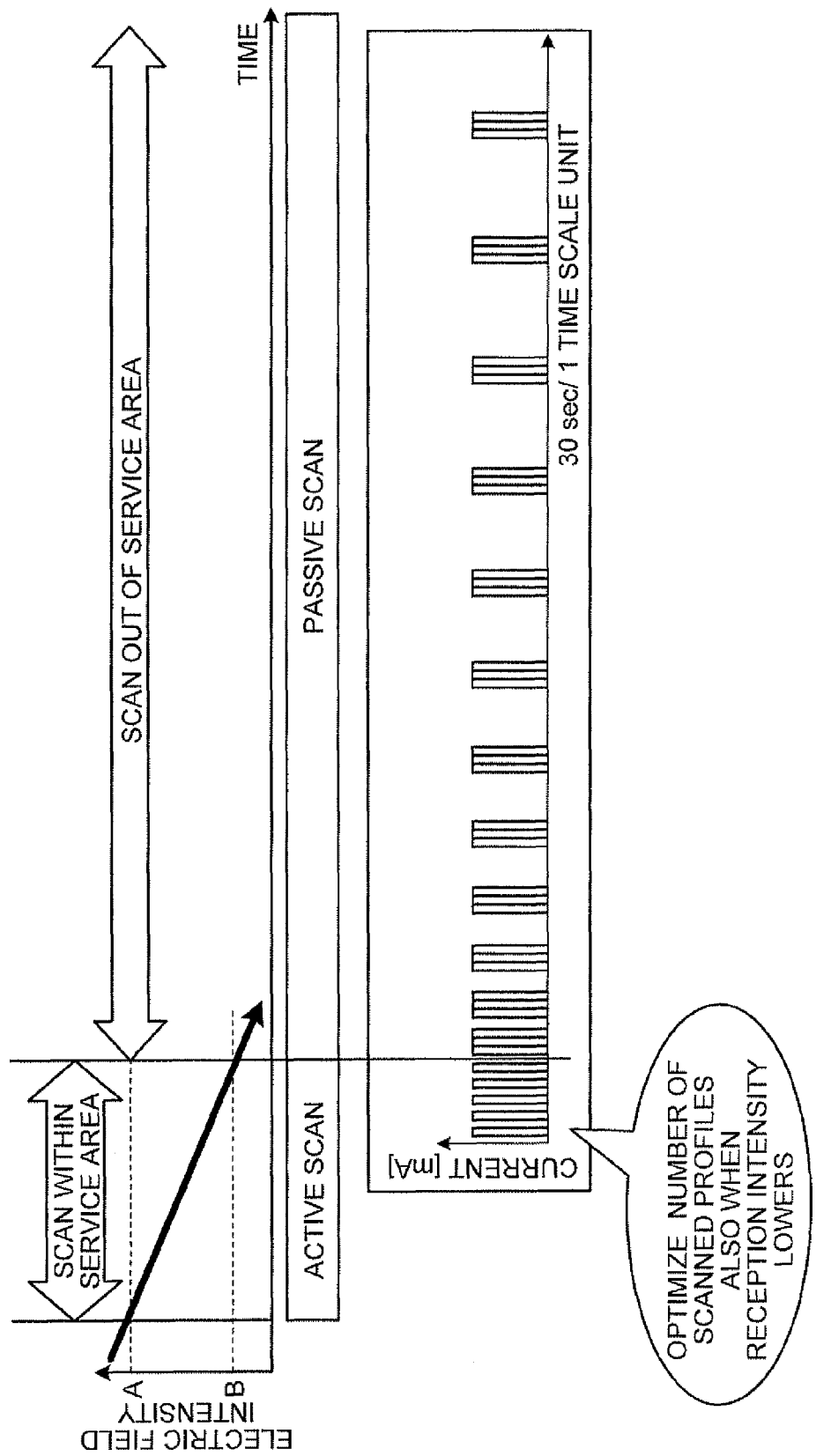
FIG. 22 is a diagram for explaining an outline of a mobile phone terminal according to a fourth embodiment of the invention.

With a mobile phone terminal 10c according to the fourth embodiment, as illustrated in FIG. 22, not only when located outside the WLAN service area, but also when it is within the WLAN service area and the electric field intensity is equal to or lower than a predetermined threshold, only a WLAN profile set as the scan profile is scanned, and the number of profiles to be scanned is optimized. The mobile phone terminal 10c according to the fourth embodiment is explained below. The same process as described previously in the first to the third embodiments is omitted.

A specific example of FIG. 22 is explained. Electric field intensity "A" indicated in FIG. 22 is a reception intensity level at which there is an access point currently in connection, and scan operation of searching for another access point is started. Electric field intensity "B" indicated in FIG. 22 is a reception intensity level at which communication with an access point currently in connection can no longer be maintained.

With the mobile phone terminal 10c of the fourth embodiment, the electric field intensity "A" is set as the first threshold, and the electric field intensity "B" is set as the second threshold. The mobile phone terminal 10c scans only a profile stored therein in association with a base station to which a current WLAN profile belongs when the reception intensity level becomes equal to or lower than the reception intensity level "A".

The mobile phone terminal 10c scans only a WLAN profile set as the scan profile for out of the WLAN service area when the reception intensity level becomes equal to or lower than the reception intensity level "B" (when it is out of the WLAN service area) similarly to the first to the third embodiments.

Figure 23:
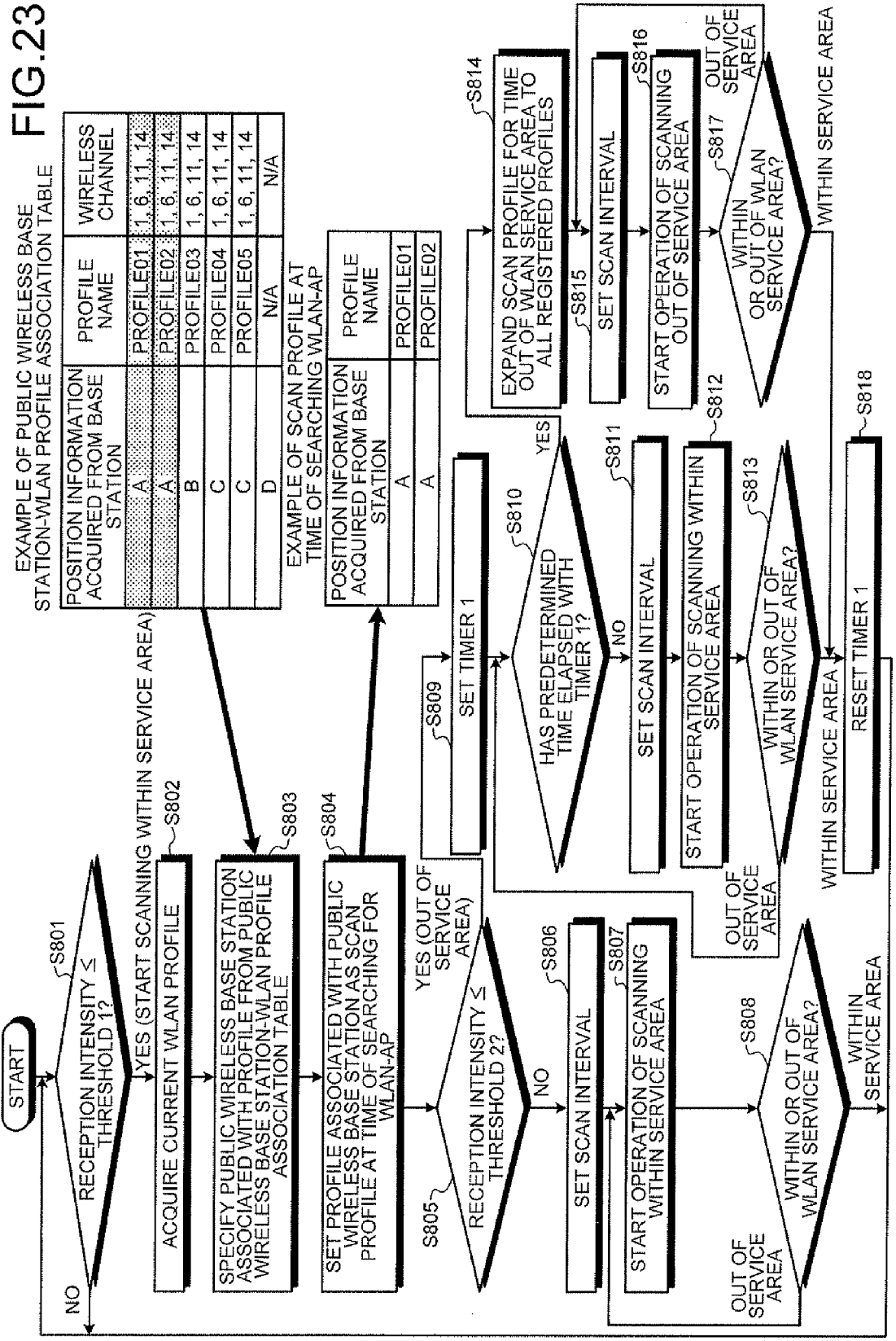
FIG. 23 is a flowchart of scan process when reception intensity of a mobile phone terminal of the fourth embodiment becomes equal to or lower than a threshold.

Operation of scanning the WLAN service area performed by the mobile phone terminal 10c of the fourth embodiment is described with reference to FIG. 23. FIG. 23 is a flowchart of scan process when reception intensity of the mobile phone terminal 10c according to the fourth embodiment becomes equal to or lower than a threshold.

As illustrated in FIG. 23, the mobile phone terminal 10c determines whether the reception intensity from a wireless LAN access point is equal to or lower than the first threshold (corresponding to the reception intensity level "A" in an example illustrated in FIG. 22) (Step S801). As a result, when the mobile phone terminal 10c determines that the reception intensity from the wireless LAN access point is equal to or lower than the first threshold, it acquires a current WLAN profile (Step S802), and specifies a public wireless base station associated with a profile acquired from a public wireless base station-WLAN profile association table (Step S803).

The mobile phone terminal 10c sets a profile associated with the specified public wireless base station as the scan profile for the time of searching for a WLAN-AP (Step S804).

Then, the mobile phone terminal 10c determines whether the reception intensity from the wireless LAN access point is equal to or lower than the second threshold (corresponding to the reception intensity level "B" in the example illustrated in FIG. 22) (Step S805).

As a result, when the mobile phone terminal 10c determines that the reception intensity from the wireless LAN access point is not equal to or lower than the first threshold, it sets a scan interval (Step S806), and performs operation of scanning within a service area for searching for a next wireless LAN access point while the mobile phone terminal 10c is in communication (Step S807).

The mobile phone terminal 10c determines whether it is within or out of the WLAN service area (Step S808). When it is out of the WLAN service area, the process returns to Step S807, and repeats operation of scanning within the service area, and when it is within the WLAN service area, the process returns to Step S801, and the process explained above is repeated.

On the other hand, when the mobile phone terminal 10c determines that the reception intensity from the wireless LAN access point is equal to or lower than the first threshold at Step S805, it sets a timer 1 (Step S809). Then, the mobile phone terminal 10c determines whether a predetermined time has elapsed with the timer 1 (Step S810), and if not, sets a scan interval (Step S811) and performs operation of scanning within a service area (Step S812).

The mobile phone terminal 10c determines whether it is within or out of the WLAN service area (Step S813). When it is within the WLAN service area, the mobile phone terminal 10c resets the timer 1 (Step S818), and the process returns to Step S801. When it is out of the WLAN service area, the process of Steps S810 to S813 is repeated until a predetermined time elapses.

When a predetermined time has elapsed with the timer 1 at Step S810, the mobile phone terminal 10c expands the scan profile for the time out of the WLAN service area to all the registered profiles (Step S814), sets a scan interval (Step S815), and starts operation of scanning outside the service area (Step S816).

Thereafter, the mobile phone terminal 10c determines whether it is within or out of the WLAN service area (Step S817). When it is within the WLAN service area, the mobile phone terminal 10c resets the timer 1 (Step S818), and the process returns to Step S801. When it is out of the WLAN service area, the process returns to Step S815, and the process explained above is repeated.

As can be seen, according to the fourth embodiment, the mobile phone terminal 10c scans only a WLAN profile set as the scan profile, not only when it is out of the WLAN service area, but also when it is within the WLAN service area, and the electric field intensity is equal to or lower than a predetermined threshold, and optimizes the number of scanned profiles. Accordingly, the mobile phone terminal 10c need not perform scan process of searching for a next access point, while the mobile phone terminal 10c is in communication, on all the profiles, and can provide a significant power saving effect.

When reception intensity from a wireless LAN access point becomes equal to or lower than a threshold, the mobile phone terminal 10c scans only a profile stored in association with a base station to which a wireless LAN profile used immediately before lowering of the reception intensity of the wireless LAN access point belongs. Accordingly, a mobile phone terminal with enhanced reconnection response, and a significant power saving effect can be provided.

While a specific embodiments have been described, other embodiments or modifications are also possible. In the following, such embodiments are explained.

Of the processes described above, all or part of the processes described as being performed automatically may be performed manually, or all or part of the processes described as being performed manually may be performed automatically with a known method. The processing procedures, the control procedures, specific names, and information including various data and parameters described above and illustrated in the drawings may be arbitrarily changed as required unless otherwise specified.

The constituent elements described above are functionally conceptual, and need not be physically configured as illustrated. In other words, the specific mode of dispersion and integration of the constituent elements is not limited to the ones illustrated in the drawings, and the constituent elements, as a whole or in part, may be divided or integrated either functionally or physically based on various types of loads or use conditions. All or any part of the processing functions performed by the devices may be realized by a central processing unit (CPU) and a program analyzed and executed by the CPU, or may be realized as hardware by wired logic.

The wireless communication terminal control method explained in the embodiments may be realized by executing a computer program on a computer such as a personal computer or a workstation. The computer program may be distributed through a network such the Internet. The computer program may also be stored in a computer-readable storage medium, such as a hard disk, flexible disc (FD), compact disc-read only memory (CD-ROM), magnetic optical disk (MO), and digital versatile disk (DVD), and may be read from the medium and executed by a computer.

As set forth hereinabove, according to an embodiment of the present invention, a terminal does not need such a device as an entrance/exit manager or a card reader, and does not need new functions to be added to a public network. Therefore, the terminal can be realized with low cost. Moreover, it can be used for any type of access points such as those for corporate use or personal use, and for generally used hotspot. Moreover, since it is not necessary to detect a position using GPS, electricity is not unnecessarily consumed for on/off control of WLAN. This realizes a mobile phone terminal with a simple configuration at low cost that achieves power saving.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A wireless communication apparatus comprising:
    a first communicator configured to communicate via each of a plurality of base stations, each of the plurality of base stations covers a base station area;
    a second communicator configured to communicate via a wireless local area network (LAN) access point that covers a wireless LAN area that overlaps multiple base station areas, the wireless LAN area is smaller than the base station area;
    a storage configured to store overlapping information indicating that a first base station area overlaps a wireless LAN area; and
    a controller configured to make the second communicator find the wireless LAN access point based on the overlapping information and, when the wireless communication apparatus moves from the first base station area to a second base station area, add additional information to the overlapping information, the additional information indicating that the second base station area overlaps the wireless LAN area.

2. A method of controlling a wireless communication apparatus that includes a first communicator configured to communicate via each of a plurality of base stations, each of the plurality of base stations covers a base station area, a second communicator configured to communicate via a wireless local area network (LAN) access point that covers a wireless LAN area that overlaps multiple base station areas, the wireless LAN area is smaller than the base station area, and a storage configured to store overlapping information indicating that a first base station area overlaps a wireless LAN area, the method comprising:
    making the second communicator find the wireless LAN access point based on the overlapping information; and
    adding, when the wireless communication apparatus moves from the first base station area to a second base station area, additional information to the overlapping information, the additional information indicating that the second base station area overlaps the wireless LAN area.

* * * * *